UNITED STATES PATENT OFFICE.

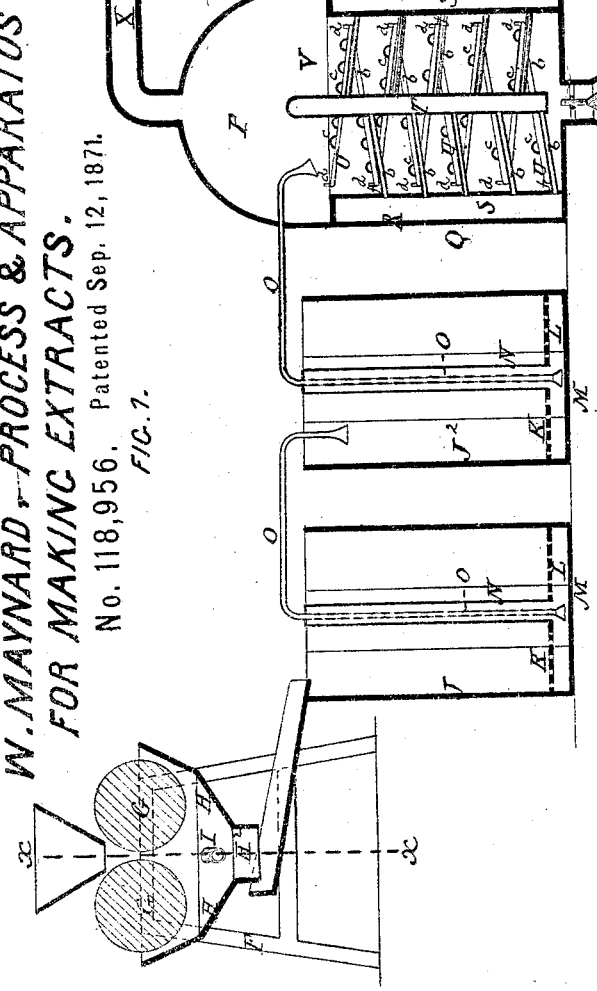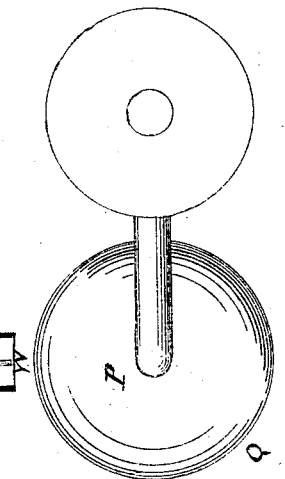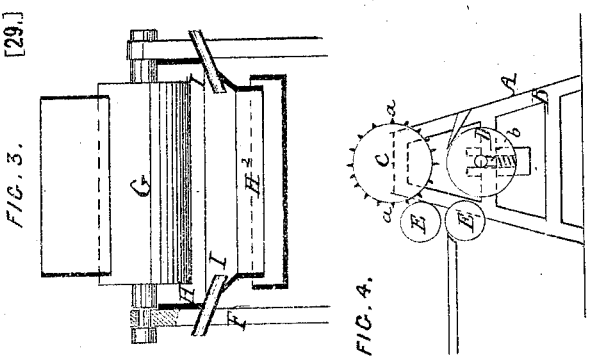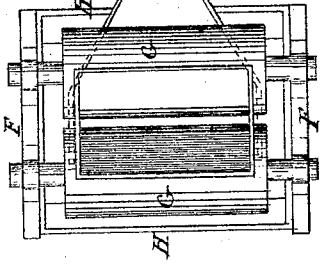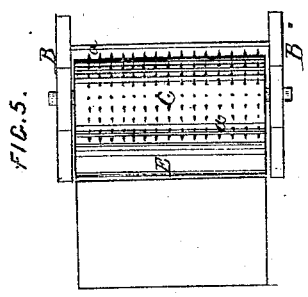
W. MAYNARD.—PROCESS & APPARATUS FOR MAKING EXTRACTS.
No. 118,956. Patented Sep. 12, 1871.

WILLIAM MAYNARD, OF SALEM, MASSACHUSETTS.

IMPROVEMENT IN APPARATUS FOR THE MANUFACTURE OF EXTRACTS FROM HEMLOCK AND OTHER BARKS.

Specification forming part of Letters Patent No. 118,956, dated September 12, 1871.

*To all whom it may concern:*

Be it known that I, WILLIAM MAYNARD, formerly of Leominster, Herefordshire, England, but at present residing in Salem, Essex county, and State of Massachusetts, United States of America, have invented a new and useful Apparatus for the Manufacture of Extracts from Hemlock and other Barks, and other substances, solid or liquid, of which the following is a full, clear, and exact description, reference being had to the accompanying drawing forming part of this specification.

The apparatus consists: First, of the combination of two rollers, arranged either one or both to be self-adjusting as to the space between them, with one roller provided with spurs or wire-brush for the purpose of removing the epidermis or scarf-skin of bark. Second, of two rollers arranged to thoroughly pulverize the bark after it has been ground in any of the ordinary bark-mills, in combination with any suitable case surrounding the same, and provided with nozzles or pipes, by which, as the bark leaves said rollers, it will be mixed with water for being then carried to the leaching-vessels. Third, of a vessel for leaching bark, &c., constructed with a pipe or tube leading from a point at or near the bottom of the vessel for the passage of the liquid extract upward and thence out of the vessel at or near its top. Fourth, of a vessel for evaporating liquid containing tannin extract or other liquids, such as juices, sirups, &c., constructed with a spiral-descending channel, along which the liquid passes, which channel is suitably heated by steam, evaporating the water contained in the extract that escapes in the form of steam at the top of the vessel, while at the bottom thereof the extract passes off or escapes.

In the accompanying drawing the improved apparatus embraced herein is illustrated—

Figure 1 being a central longitudinal vertical section; Fig. 2, a plan view; Fig. 3, a vertical cross-section in plane of line $x\ x$, Fig. 1; Fig. 4, an end elevation of the parts adapted to remove the epidermis or scarf-skin from the bark.

A, in the drawing, represents a frame-work, consisting of two parallel upright-frames, B, in and between which are located two rollers, C D, one above the other, to turn in suitable bearings thereof. The upper one of these rollers is provided with short spurs or teeth $a$ of suitable size and at proper distances apart, while the lower one is without teeth, and is adapted by yielding bearing-blocks $b$ to adjust itself with regard to the space between it and the toothed cylinder. Between these two rollers C D the bark is passed with its epidermis or scarf-skin toward the toothed cylinder, and for the purpose of feeding the same along thereto feed-rollers E are provided. By the revolution of the roller C the scarf-skin or epidermis of the bark is removed not only from the outside thereof, but from the interstices. F are parallel vertical frames, in which are located two rollers, G, one alongside of the other, between which the bark, after having been ground in any ordinary bark-mill, is passed for the purpose of being completely ground and pulverized. These rollers are to be adapted to run, the one faster than the other. Incasing the rollers G, and below the same, is a box, H, having an opening, $H^2$, at the bottom for the escape of the pulverized bark from the rollers G, and two pipes or nozzles, I, for the flow of water to the bark before it passes out from the case. J, the leaching-vessels constructed of any suitable form, and with a perforated false bottom, K, leaving a chamber, L, between it and the true bottom M. N, a tube communicating with the chamber L of leaching-vessel J, and extending upward therefrom to the top or nearly so of the vessel, where its end is closed. Within this tube N, and extending through its whole length, communicating with the chamber L, is a smaller and perforated pipe, O, leaving a space between it and the inner periphery of tube N, which space, as well as the chamber L of leaching-vessel, is to be filled with pumice-stone or other suitable filtering medium, pumice-stone being the most preferable. The pipe O extends out from the closed end of tube N, such extension having no perforations. In the drawing this pipe O is shown as communicating with another leaching-vessel, $J^2$, constructed and arranged similarly to the vessel J just above described, the pipe O of said second vessel $J^2$ being shown as connected with the dome or upper portion P of an evaporator, Q, to be herein described.

The action of the leaching-vessel J is to extract from the bark placed therein its tannin principle, which, as water, charged therewith, passes up through the tube N and pipe O and the extension of the pipe O into the next leaching-vessel, where, mixing with the water and bark therein, it becomes further charged with tannin principle, and from thence similarly escapes into the evaporator Q, the pipe O acting on the siphon principle. With a series of sufficient number of leaching-vessels, such as above described, it is obvious the strongest tannin principle of bark can be extracted; but in the carrying out of this invention it is not intended to limit it to the use of any particular number of leaching-vessels, the number thereof depending on circumstances and the material being leached. The evaporator Q is in the present instance shown as made of a cylindrical shape and surmounted by a dome, P. The lower portion or body R of the evaporator is surrounded by a space or chamber, S, into which steam is admitted for heating the same, a pipe, T, with radiating pipes $b$ leading to the said chamber S, being the means of communication for the steam. Within the body R of evaporator Q is arranged a continuous spiral-descending plate, U, on the upper end V of which the tannin liquid from the leaching-vessel is delivered, passing thence down over the plate U to the bottom of evaporator, where it escapes through a pipe, W, communicating with the evaporator at such end. As the tannin liquid passes over the spiral-descending plate U it becomes heated from the steam in the pipe T and radiating pipes $a$, (which it is preferable to run directly in contact with the under side of plate U,) causing its watery particles to be evaporated, which, as steam, escape through pipe X into a channel, Y, to be constructed for an action on the well-known "Torricellian vacuum" principle, the tannin principle or extract discharging at the bottom pipe W. To prevent the tannin liquid running off of the evaporating-plate U it is provided with a raised flange, $d$, along its edge, and, to prevent a too ready flow or travel of the tannin liquid through the evaporator, the evaporating-plate is provided at points with obstructions $c$, which may be made of various shapes, as, for instance, in the form of loops, as shown. In arranging the obstructions $c$ it is best that they should be closer together at the upper end of the evaporating-plate than at the lower end, for the reason that the liquid is the thinnest when entering the vessel, and therefore contains then the greatest quantity of water to be evaporated. In arranging the evaporating-plate U within body of evaporator Q a space, $f$, must be left for ascent of the steam between its edges and the inner wall of steam-jacket. And to prevent back action of the Torricellian vacuum-chamber by the admission of air at the tannin discharge-pipe W a valve, Z, should there be arranged for operation, to open outwardly but to close inwardly.

Although the apparatus has been described with particular reference to hemlock bark, it is susceptible of adaptation to other bark, &c., and, furthermore, as an evaporator, to the evaporation of juices, &c.

Having thus described my invention, I shall state my claims, as follows:

1. The rollers G G arranged within the hopper H, provided with openings $H^2$ and pipes I I, in combination with the leaching-vessel J having a false bottom, K, and with the evaporator Q, substantially as set forth.

2. The leaching-vessels J $J^2$, provided with the central pipe N and false bottom K, arranged for operation substantially as described.

3. The pipes O O extending out from the closed end of the tubes N N of the leaching-vessels J $J^2$, having false bottoms K K, in combination with the dome P of the evaporator Q, substantially as described.

4. The body R of the evaporator Q, surrounded by the chamber S, in combination with the heating-pipe T, radiating-pipes $b$, spiral plate U, opening W, pipe X, and chamber Y, substantially as described.

5. In combination with the evaporator Q, constructed as described, the valve Z and space $f$, as and for the purpose set forth.

6. The frame A, spiked roller C, adjusting roller D, and guide rollers E E, as and for the purpose set forth.

The above specification of my improved process for manufacturing extracts from bark, &c., signed by me this 18th day of February, A. D. 1871.

WM. MAYNARD.

Witnesses:
 ALBERT W. BROWN,
 CHAS. J. TAYLOR.